(12) United States Patent
Motovsky et al.

(10) Patent No.: US 11,097,373 B2
(45) Date of Patent: Aug. 24, 2021

(54) SPRING PACKAGE FOR A VIBRATION WELDING DEVICE AND RESPECTIVE VIBRATION WELDING DEVICE

(71) Applicant: Branson Ultraschall Niederlassung der Emerson Technologies GmbH & Co. OHG, Dietzenbach (DE)

(72) Inventors: Michal Motovsky, Hlohovec (SK); Wilfried Lotz, Neuberg (DE); Wolfgang Kreckel, Hösbach (DE)

(73) Assignee: Branson Ultraschall Niederlassung der Emerson Technologies GmbH & Co. OHG

( * ) Notice: Subject to any disclaimer, the term of this patent is extended or adjusted under 35 U.S.C. 154(b) by 0 days.

(21) Appl. No.: 16/850,247

(22) Filed: Apr. 16, 2020

(65) Prior Publication Data
US 2020/0331091 A1   Oct. 22, 2020

(30) Foreign Application Priority Data
Apr. 16, 2019 (EP) .................................... 19169521

(51) Int. Cl.
*B23K 20/00* (2006.01)
*B23K 20/10* (2006.01)
*B23C 3/16* (2006.01)

(52) U.S. Cl.
CPC ............... *B23K 20/10* (2013.01); *B23C 3/16* (2013.01)

(58) Field of Classification Search
CPC ............................ B23K 20/1205; B23K 20/10
See application file for complete search history.

(56) References Cited

U.S. PATENT DOCUMENTS 4,086,122 A * 4/1978 Bouyoucos ......... B29C 66/8322
156/556
5,468,336 A   11/1995 Lotz et al.
(Continued)

FOREIGN PATENT DOCUMENTS

CN   202 846 890 U   4/2013
CN    203210686 U   9/2013
(Continued)

OTHER PUBLICATIONS

J.T.P. Castro et al.; "A note on notch shape optimization to minimize stress concentration effects"; Theoretical and Applied Fracture Mechanics; vol. 84; Aug. 2016; p. 72-85; Elsevier Ltd.
(Continued)

*Primary Examiner* — Erin B Saad
(74) *Attorney, Agent, or Firm* — Barclay Damon LLP

(57) ABSTRACT

A spring package for a vibration welding device includes a first longitudinal bar for a fixed connection to a frame of the vibration welding device and a second longitudinal bar parallel to and movable with respect to the first longitudinal bar as well as for connection to a tool. A first axis of the spring package extends halfway between and parallel to the longitudinal axis of the first and second longitudinal bar. A plurality of leaf springs are further provided, each connected with a first end to the first longitudinal bar and with a second end to the second longitudinal bar, wherein a second axis of the spring package extends perpendicular to the first axis as well as, in an inactive state of the spring package, parallel to the plurality of leaf springs so that a spring center line extends, in an inactive state of the spring package, parallel to the second axis in the middle of the leaf spring. Each of the plurality of leaf springs includes a first portion adjacent to the first and/or second longitudinal bar, the first portion consisting of at least one radius so that the first portion is formed concave with respect to the spring center line. The
(Continued)

Figure 1:
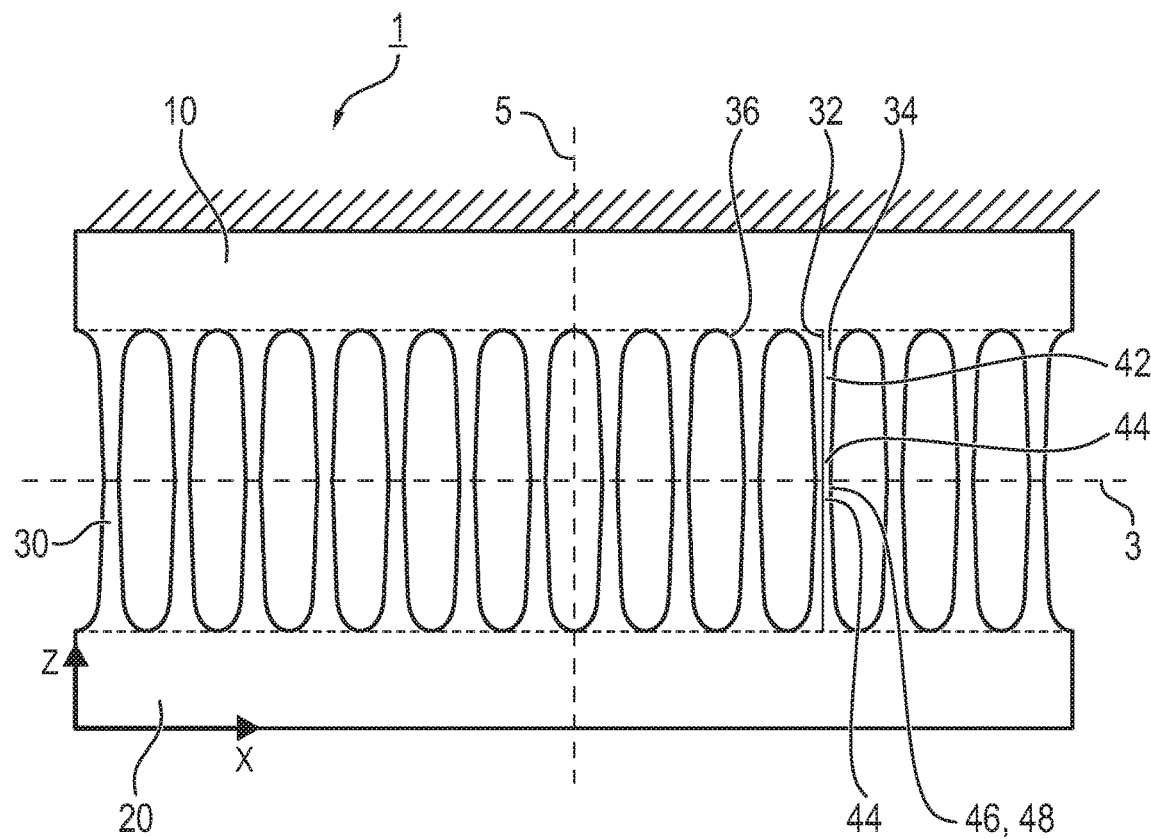

first portion transitions continuously into a second portion which is formed convex with respect to the spring center line, and the second portion transitions continuously into a center portion adjacently arranged relative to the first axis so that a thickness of the respective leaf spring is at the lowest in the center portion, especially at the first axis.

12 Claims, 13 Drawing Sheets

(56) References Cited

U.S. PATENT DOCUMENTS

| 9,623,642 | B2 | 4/2017 | Trabandt et al. |
| 2010/0288092 | A1 | 11/2010 | Manger et al. |

FOREIGN PATENT DOCUMENTS

| CN | 205 291 572 U | 6/2016 |
| EP | 0 497 322 A1 | 8/1992 |
| EP | 1 834 754 A2 | 9/2007 |
| JP | H09-108857 A | 4/1997 |
| WO | WO 2009/068293 A1 | 6/2009 |
| WO | WO 2013/135893 A1 | 9/2013 |

OTHER PUBLICATIONS

Korean Office Action for KR 10-2020-0039702; dated Feb. 26, 2021; 9 pages.
Japanese Notice of Reasons for Rejection for JP 2020-033556; dated Jan. 28, 2021; 5 pages.
Chinese Office Action for CN 202010242166.X; dated Jun. 23, 2021; 13 pages.

* cited by examiner

SPRING PACKAGE FOR A VIBRATION WELDING DEVICE AND RESPECTIVE VIBRATION WELDING DEVICE

CROSS REFERENCE TO RELATED APPLICATION

This application claims priority of European Patent Application No. EP 19 169 521.2, filed on Apr. 16, 2019, under applicable portions of 35 U.S.C. § 119. The entire content of the priority application is incorporated herein by reference in their entirety.

FIELD OF THE INVENTION

The present invention is related to a spring package for a vibration welding device, a vibration welding device comprising the spring package, a manufacturing method for the spring package as well as a retrofitting method for providing a vibration welding device with a spring package.

BACKGROUND OF THE INVENTION

The usage of spring packages in vibration welding devices is generally well known. For example, WO 2009/068293 A1, directed to a vibration cutting device and a method for vibration cutting, describes a device comprising two vibration heads, each of which comprises two spring packages which are arranged parallel to each other.

EP 1 834 754 A2 describes another vibration welding device as well as a respective vibration head. Here, discs springs are used for forming a spring package.

Another vibration welding machine and method for operating a vibration welding machine is described in WO 2013/135893 A1. In this device, two spring packages arranged in a row are used.

Finally, EP 0 497 322 A1 describes a leaf spring arrangement for the vibration head of a vibration welding device. The leaf spring arrangement consists of individual leaf springs which are coupled to each other.

Each spring package of the above described vibration welding devices consists, with the exception of the device according to EP 1 834 754 A2, of a first and a second longitudinal bar and a plurality of leaf springs extending therebetween. Each leaf spring comprises adjacent to the first and second longitudinal bar a first portion defined by one sole radius. In other words, the gap between two adjacent leaf springs is formed adjacent to the first and second longitudinal bar corresponding to a half circle or semi-circle. The ends of one these semi circles are each connected to the opposite ends of the oppositely arranged semi-circle by means of a straight linear line so that the gap has, in a side view of the spring package, an oblong shape or the shape of an oblong hole.

An object of the present invention is to optimize the design of the leaf springs, and thus of the spring package, with respect to the stress or load distribution as well as in view of the manufacturing costs compared to the prior art designs while at the same time maintaining the quality and characteristics provided by the spring packages according to the prior art.

SUMMARY OF THE INVENTION

The above object is solved by a spring package for a vibration welding device 1, a vibration welding device comprising the spring package 11, a manufacturing method for the spring package 12 as well as a retrofitting method for providing a vibration welding device with a spring package according to the claims. Further preferred embodiments and developments result from the following description, the drawings as well as the appending claims.

An inventive spring package for a vibration welding device comprises a first longitudinal bar for a fixed connection to a frame of the vibration welding device, a second longitudinal bar being parallel to and movable with respect to the first longitudinal bar as well as for a connection to a tool, wherein a first axis of the spring package extends halfway between and parallel to the longitudinal axis of the first and second longitudinal bar, a plurality of leaf springs each of which is connected with a first end to the first longitudinal bar and with a second end to the second longitudinal bar, wherein a second axis of the spring package extends perpendicular to the first axis as well as, in an inactive state of the spring package, parallel to the plurality of leaf springs so that a spring center line extends, in the inactive state of the spring package, parallel to the second axis in the middle of the leaf spring, and each of the plurality of leaf springs comprises adjacent to the first and/or second longitudinal bar a first portion consisting of at least one radius so that the first portion is formed concave with respect to the spring center line, wherein the first portion transitions continuously into a second portion which is formed convex with respect to the spring center line, and the second portion transitions continuously into a center portion arranged adjacent the first axis so that a thickness of the respective leaf spring is at the lowest in the center portion, especially at the first axis.

For an easier understanding, the inventive spring package will be explained based on an exemplary embodiment. Further, a right-handed Cartesian coordinate system is used so that the relationship of the members of the spring package is clearly defined. In this regard, it is in particular preferred that the members of the spring package, i.e. the first and the second longitudinal bar as well as the plurality of leaf springs, are formed in one piece.

In the example, the first and second longitudinal bar are each defined by a cuboid, preferably identical cuboids. A corner of one of the cuboids can be used, for example, as basis for the right-handed Cartesian coordinate system of the spring package. Due to the cuboid shape, the first and second longitudinal bar each have a base face defined by a rectangle, wherein the longitudinal side defines a longitudinal or first axis, corresponding to the x-axis of the Cartesian coordinate system, and the shorter side defines a second axis, corresponding to the y-axis of the Cartesian coordinate system. In this regard, one of the faces having the largest surface area is considered as base face. Consequently, the third axis of the cuboid, i.e. the z-axis of the Cartesian coordinate system, defines the height. The height of the first bar is preferably equal to the height of the second bar.

Additionally, the first and the second bar are arranged with one of their base faces opposite to each other in a desired or technically given distance. In this arrangement, imaginary first planes of the first and second longitudinal bar defined by the respective base faces, i.e. the first and second axis of the respective cuboid or the x-axis and y-axis of the Cartesian coordinate system, are parallel to each other. Consequently, the first axis of the spring package extends parallel to the longitudinal or first axis of the first and second longitudinal bar and thus parallel to the x-axis of the Cartesian coordinate system. The second axis of the spring package extends parallel to the z-axis of the Cartesian coordinate system. Thus, the second axis of the spring package extends perpendicular to the first axis.

Moreover, the first axis is part of the imaginary first plane which extends halfway between the first and second longitudinal bar, i.e. halfway along the z-axis of the Cartesian coordinate system. As will be explained later, this first axis thus forms, in an inactive state of the spring package, a first axis of symmetry for the complete spring package.

Between the so arranged first and second bar, the plurality of leaf springs is arranged. Accordingly, the first end of each leaf spring is connected to the first bar and the second end is connected to the second bar. Thus, the second axis not only extends perpendicular to the first axis but also, in an inactive state of the spring package, parallel to the plurality of leaf springs.

Furthermore, and in an inactive state of the spring package, the center line of each leaf spring extends parallel to the second axis of the spring package in the middle of the leaf spring and, thus, in a direction which is rectangular with respect to the imaginary first planes, i.e. parallel to the z-axis of the Cartesian coordinate system. In this state, the center line of each leaf spring also forms an axis of symmetry for the respective leaf spring. For the sake of completeness, in case the second axis of the spring package is constructed in the middle of the first and second longitudinal bar, i.e. halfway along the x-axis of the Cartesian coordinate system, it provides a further axis of symmetry for the spring package.

An extension of each leaf spring parallel to the y-axis of the Cartesian coordinate system is preferably equal to the extension of the first and the second longitudinal bar in y-direction. Concerning the extension of the leaf spring in x-direction of the Cartesian coordinate system, which may also be denoted as thickness direction of the leaf spring, it varies along the course of the leaf spring in z-direction, as will be explained in the following.

The shape of each leaf spring may be considered, basically, as consisting of a double T-shape, wherein the transverse bar of the T serves for connecting to the respective longitudinal bar and both T-shapes abut each other at the first axis of the spring package, i.e. in the middle halfway between the longitudinal bars. Accordingly, each of the plurality of leaf springs comprises adjacent to the first and/or second longitudinal bar the first portion and in the region of the first axis of the spring package the center portion. The first and the center portion are connected to each other by means of the second portion.

The first portion consists of at least one radius so that the first portion is formed concave with respect to the spring center line. Accordingly, the thickness of the leaf spring, i.e. the extension in x-direction of the Cartesian coordinate system, decreases when following the center line from one of the longitudinal bars in the direction of the first axis of the spring package.

In the region of the center portion, the thickness of the leaf spring is at the lowest. This is contrary to the above discussed arrangements according to the prior art wherein the thickness of the leaf springs does not change, except in the first portion.

Due to the definition that the thickness is at the lowest in the center portion, the second portion connecting the first portion and the center portion must have a tapered shape with respect to the center line of the leaf spring. Accordingly, the first portion transitions continuously into the second portion which transitions in turn continuously into the center portion arranged adjacent the first axis of the spring package. In this regard, and according to the invention, the second portion does not have the shape of a straight linear line which is inclined with respect to the center line but is, contrary to this, formed convex. Thus, and compared to a straight linear line, the reduction in thickness along the center line from the respective bar toward the center portion is reduced, at least in a region of the second portion adjacent to the first portion.

Concerning the connection of all previous portions to each other as well as to the respective first and second longitudinal bar, the connection must satisfy in general the equations (1) and (2) at the point of connection $(x_c, y_c)$:

$$f'(x_c) = g'(x_c) \qquad (1)$$

$$f(x_c) = g(x_c) \qquad (2)$$

That means that derivation of curve and function value must be at the connection point the same. This has to be satisfied between all used portions, i.e. between center portion and convex second portion as well as between the convex second portion and the first portion.

When defining the connection of the portions by isolated points and linear interpolation, it is only possible to define derivation by differences. In general based on the following equation (3):

$$f'(x_i) \approx \frac{f(x_{i+1}) - f(x_i)}{x_{i+1} - x_i} \qquad (3)$$

with:
  $f'(x_i)$: derivation at point $x_i$
  i: serial number of the point.

A first advantage of this specific design, especially of the leaf springs, is that due to the convex shape of the second portion, the load experienced during usage of the spring package by the respective leaf spring can be significantly reduced. Especially, the load is distributed more equally within the leaf spring. Thus, and considering the same application, the overall load experienced by the inventive spring package is reduced compared to the prior art spring package. To this end, the lifetime of the spring package is further increased.

Due to this, there exists the possibility to reduce the number of leaf springs used in the spring package compared to the prior art spring package while at the same time maintaining the overall stress or load distribution within the range of the load distribution of the prior art spring package. Consequently, and due to the reduction of leaf springs, the manufacturing costs of the inventive spring package are reduced while still maintaining the quality and characteristics provided by the prior art spring packages.

In a preferred embodiment of the inventive spring package, the second portion has the shape of a natural curve, especially a portion of a parabola, an exponential function, a Fibonacci curve, a hyperbola or the like. It was found that the shape of such natural curves leads to a specifically homogenous stress of load distribution within the leaf spring and, thus, the spring package.

In a further preferred embodiment of the spring package, the leaf spring arranged at the end of the first and second longitudinal bar comprises a first portion which, with respect to the spring center line, is shorter on an outer side of the spring package compared to an inner side of the spring package. The prior art spring packages consist of a plurality of identical leaf springs. Accordingly, and considering the point at which the first portion transitions tangentially into the respective longitudinal bar, the extension of the first portion from the center line in plus and minus x-direction of the Cartesian coordinate system are the same. In other words, the middle of the linear line defined by the two points at which the first portion transitions tangentially into the respective longitudinal bar is arranged on the center line. Now, and with respect to the preferred embodiment, the middle is displaced from the center line. This is realized by shortening the outward facing side of the first portion of the leaf spring arranged at the end of the spring package. By means of this shortening, the stress or load distribution especially within the last and, preferably, next-to-last leaf spring can be reduced compared to a leaf spring at the end of the spring package and having a non-shortened first portion.

According to another preferred embodiment of the spring package, the center portion comprises a third portion consisting of at least one radius so that the third portion is formed concave with respect to the spring center line. Additionally, it is preferred that the center portion comprises between the third portion and the adjacent second portion a fourth portion which is formed in a linearly tapering manner with respect to the spring center line. Each of the portions transitions continuously, i.e. without step, and especially tangentially into the adjacent portion, as already discussed above. Due to the concave shape of the center portion, no acute angle is present at the first axis of the spring package but a rounded curve. This arrangement further improves the stress distribution within the leaf spring and ensures that the thickness does not fall below a required minimum which would weaken the arrangement.

Figure 2:
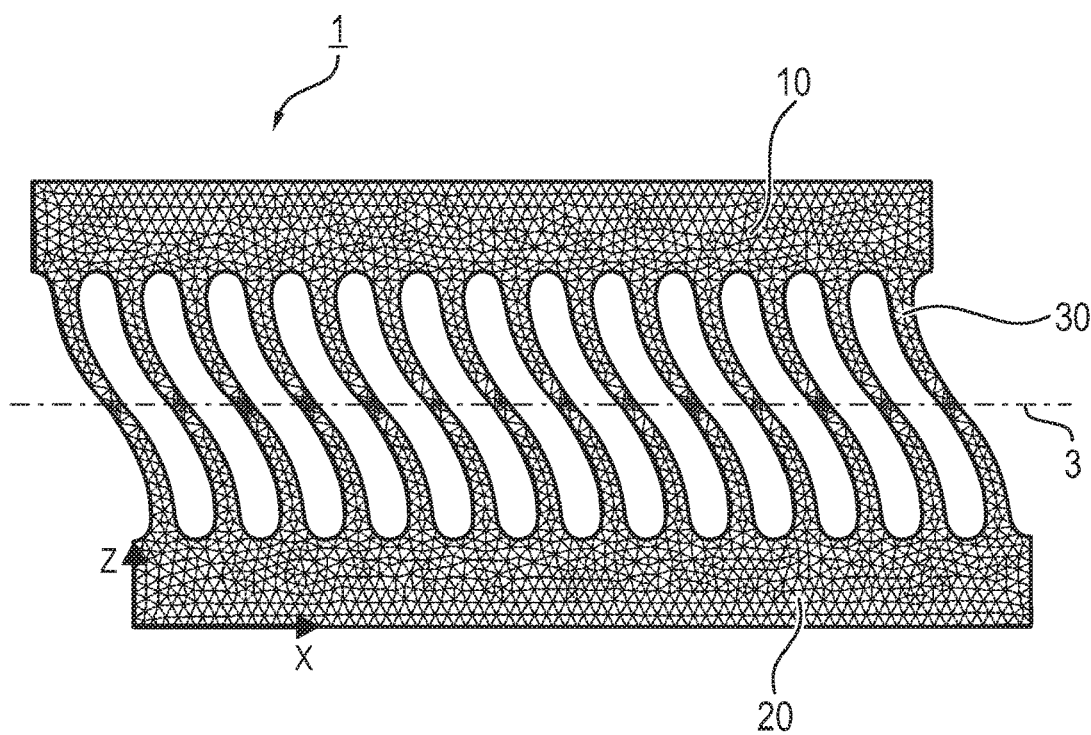

It is also preferred that the first portion comprises at least two different radii and the smaller radius of the at least two different radii is present adjacent to the first and/or second longitudinal bar and the larger radius of the at least two different radii is present adjacent to the second portion. In particular, it is preferred that the first portion has a variable radius. With respect to the term variable radius and its definition, it is especially referred to the publication of J. T. P. Castro et al: "A note on notch shape optimization to minimize stress concentration", in Theoretical and Applied Fracture Mechanics 84, 2016, p. 72-85, Elsevier Ltd. Therein, it is referred to Grodzinski's graphical recipe for shoulder fillets proposed in 1941 which is also shown in FIG. 2 of this publication.

Returning to the preferred embodiment of the spring package, the first portion transitions at the one end continuously, especially tangentially, into the respective bar and at the other end continuously, especially tangentially, into the second portion. The usage of at least two different radii for the first portion further improves the stress or load distribution within the leaf spring compared to the leaf springs used in the prior art spring packages.

According to another preferred embodiment of the spring package, two adjacent leaf springs are connected to each other at the first and second longitudinal bar so that the side of the first portion of the first leaf spring facing the adjacent second leaf spring directly and continuously transitions into the side of the first portion of the adjacent second leaf spring facing the first leaf spring. Thus, and as already explained with respect to the embodiment having the center portion with the concave third portion, the first portion of one leaf spring transitions directly and continuously into the first portion of the adjacent spring. This arrangement provides a specifically compact spring package.

According to a preferred alternative embodiment, two adjacent leaf springs are separated at the first and/or second longitudinal bar as well as at the sides of the respective first portion facing each other by a linear portion extending parallel to the first axis. This arrangement is particularly useful in case of a desired extension in the above discussed x-direction of the Cartesian coordinate system so that, although the number of the springs may be reduced compared to a prior art spring package, the overall length, i.e. extension in x-direction, remains unchanged. By proceeding this way, the spring package according to this preferred embodiment may replace a prior art spring package in a vibration welding device without any further adaption.

An inventive vibration welding device comprises at least one inventive spring package. By using the inventive spring package in a vibration welding device, the advantages mentioned above for the inventive spring package can be realized with the vibration welding device. Thus, and for avoiding repetitions, it is referred to the above explanations.

An inventive manufacturing method for an inventive spring package, comprises the steps of providing a block of material, processing the block of material, especially by milling, to create the first and the second longitudinal bar as well as the plurality of leaf springs, wherein each of the plurality of leaf springs comprises adjacent to the first and/or second longitudinal bar a first portion consisting of at least one radius so that the first portion is formed concave with respect to the spring center line, wherein the first portion transitions continuously into the second portion which is formed convex with respect to the spring center line and the second portion transitions continuously into the center portion arranged adjacent the first axis so that a thickness of the respective leaf spring is at the lowest in the center portion, especially at the first axis. Accordingly, the inventive spring package can be manufactured by means of the inventive manufacturing method. Consequently, it is referred to the above discussion for the inventive spring package regarding the advantages and technical effects.

An inventive retrofitting method for providing a vibration welding device with at least one inventive spring package comprises the steps: providing at least one inventive spring package, de-mounting the at least one spring package being present in the vibration welding device and mounting the at least one inventive spring package into the vibration welding device. Thus, by means of this retrofitting method, a vibration welding device being already present, for example at a customer's site, can be effectively equipped with the inventive spring package so that also the above mentioned advantages and technical effects may be realized by such vibration welding device after retrofitting.

SHORT DESCRIPTION OF THE DRAWINGS

Figure 3:
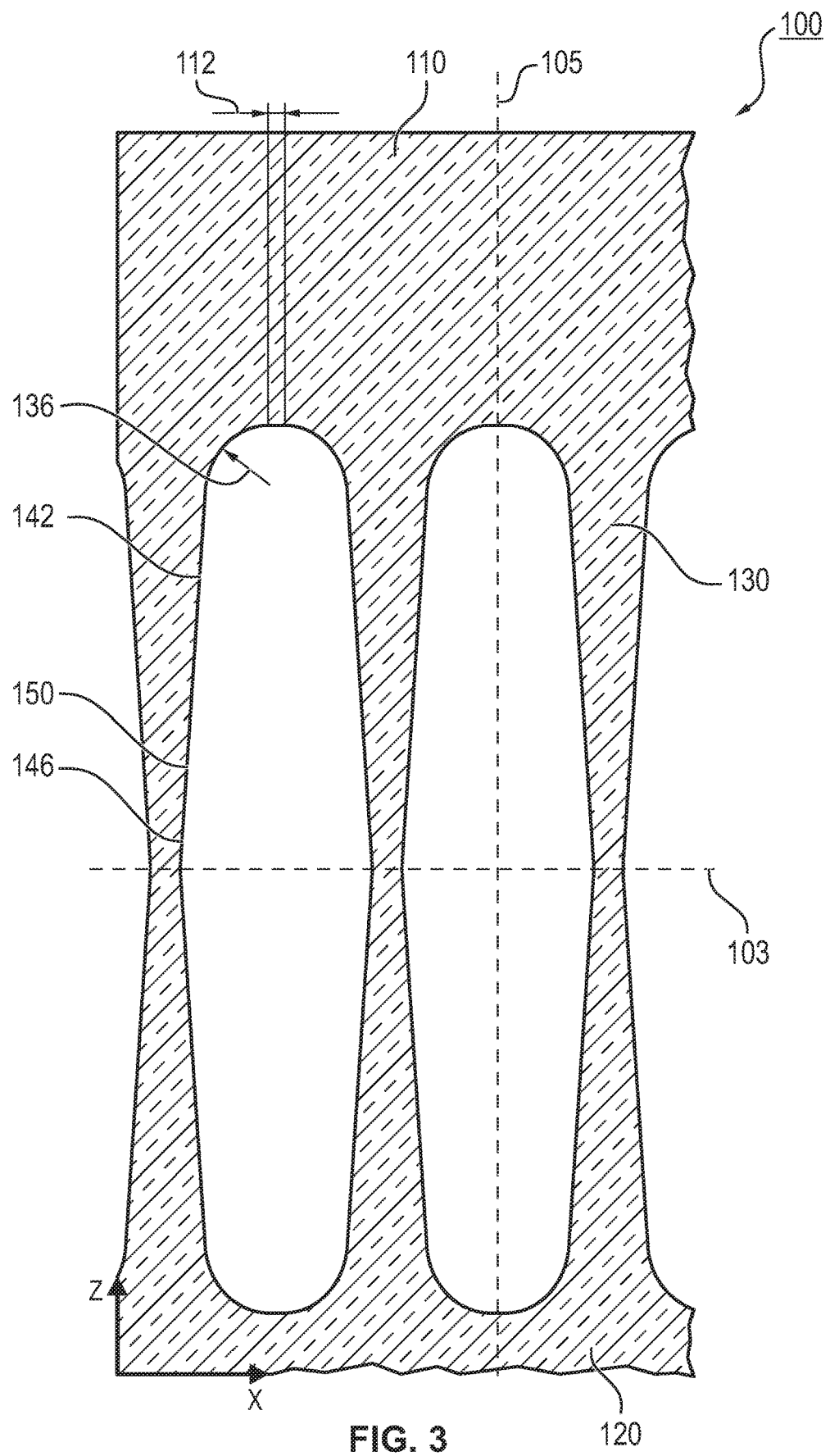
Figure 4:
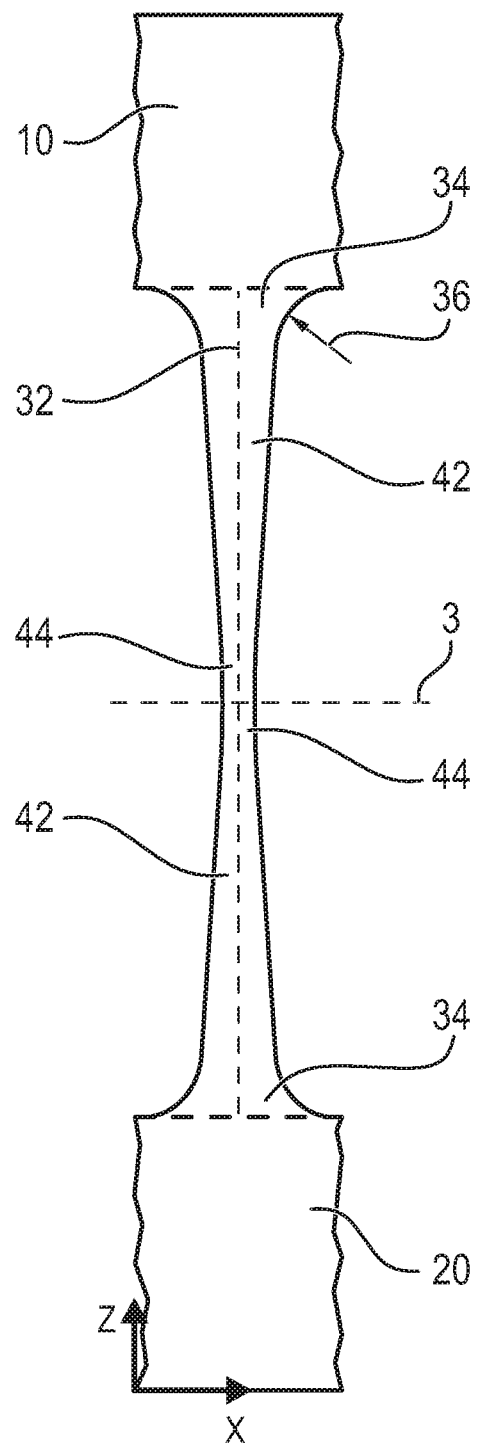
Figure 5:
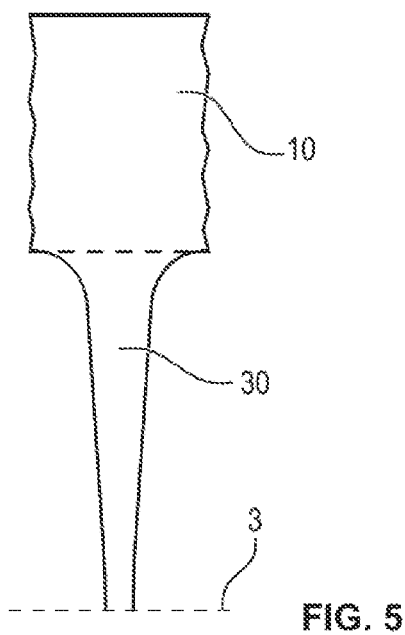
Figure 6:
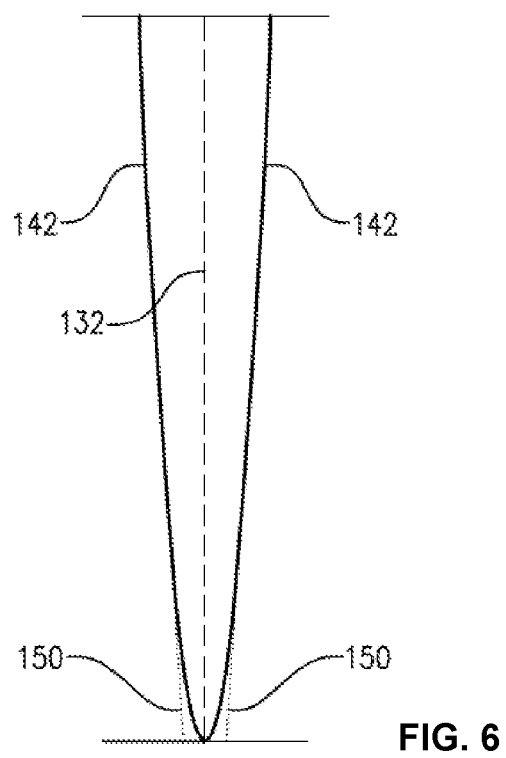
Figure 7:
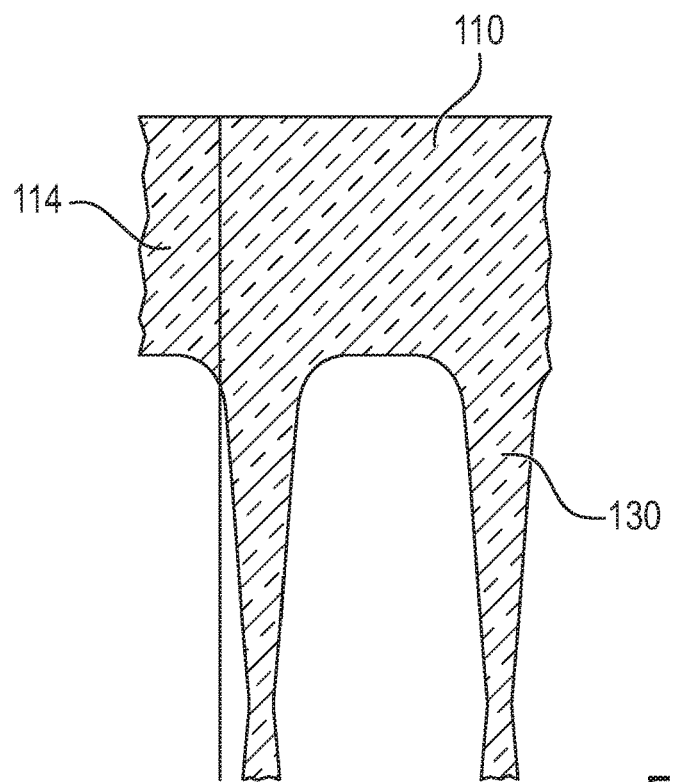
Figure 8:
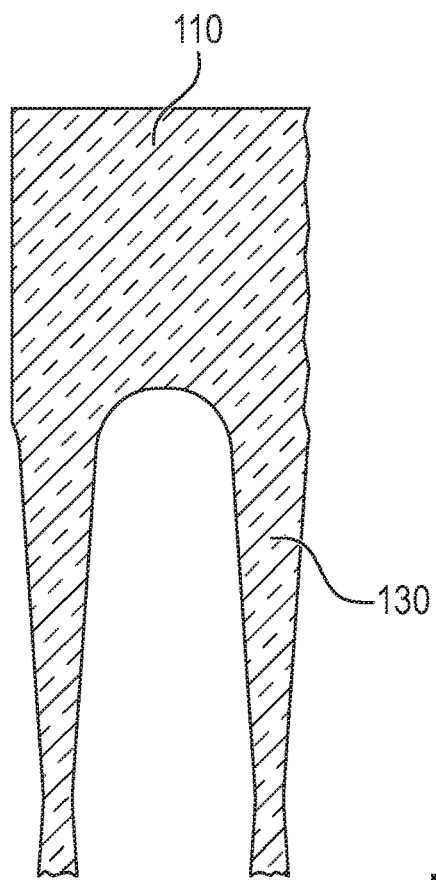
Figure 9:
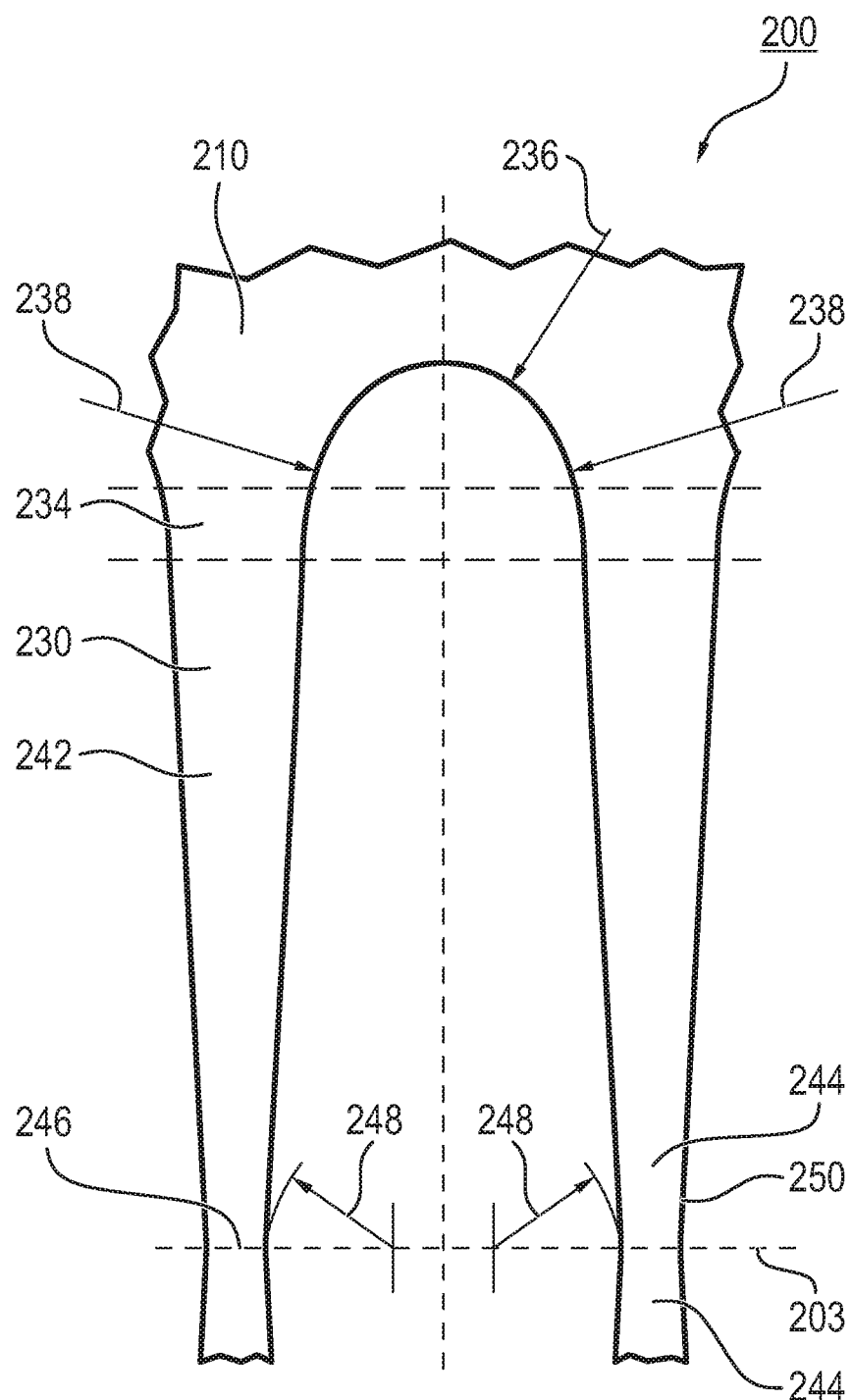
Figure 10:
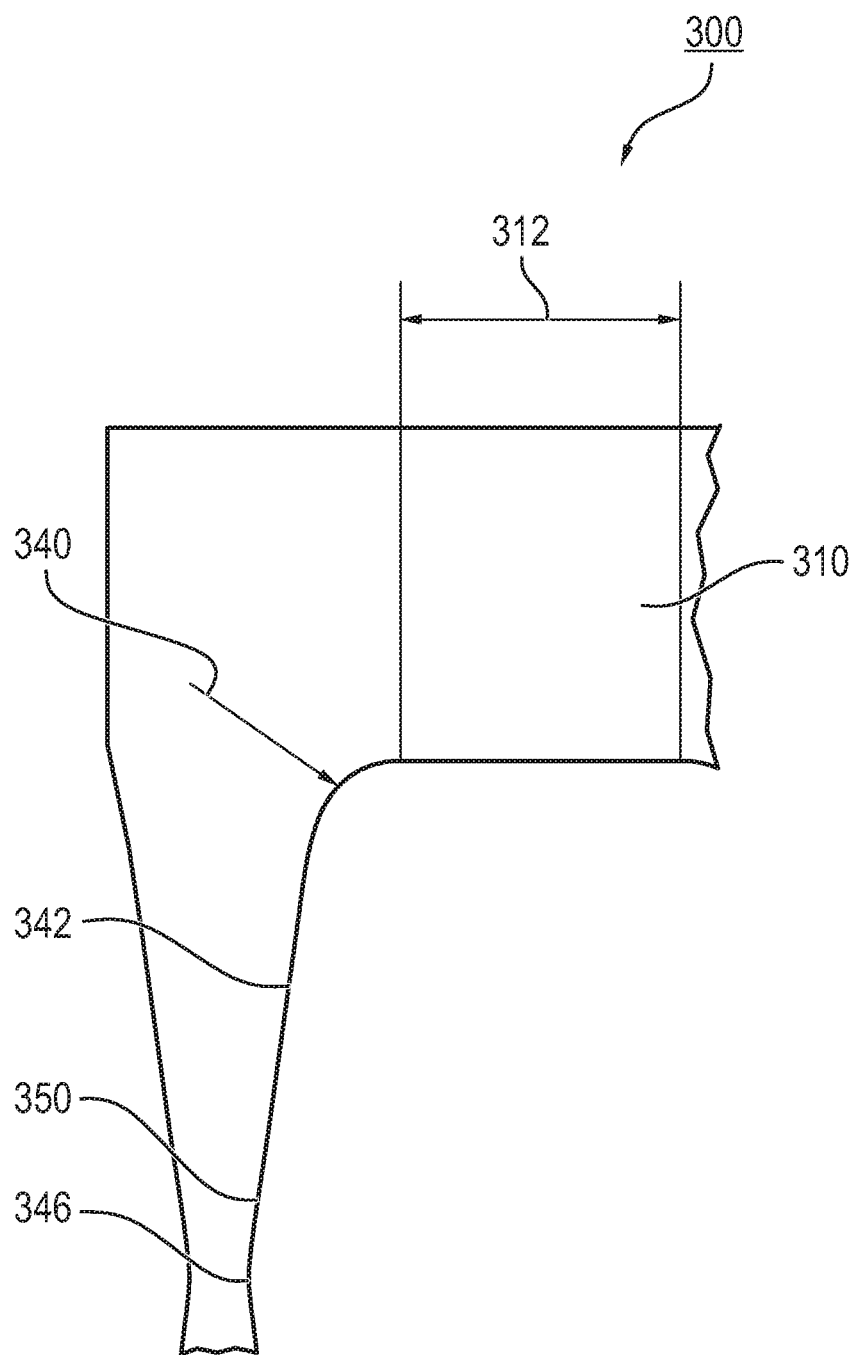
Figure 11:
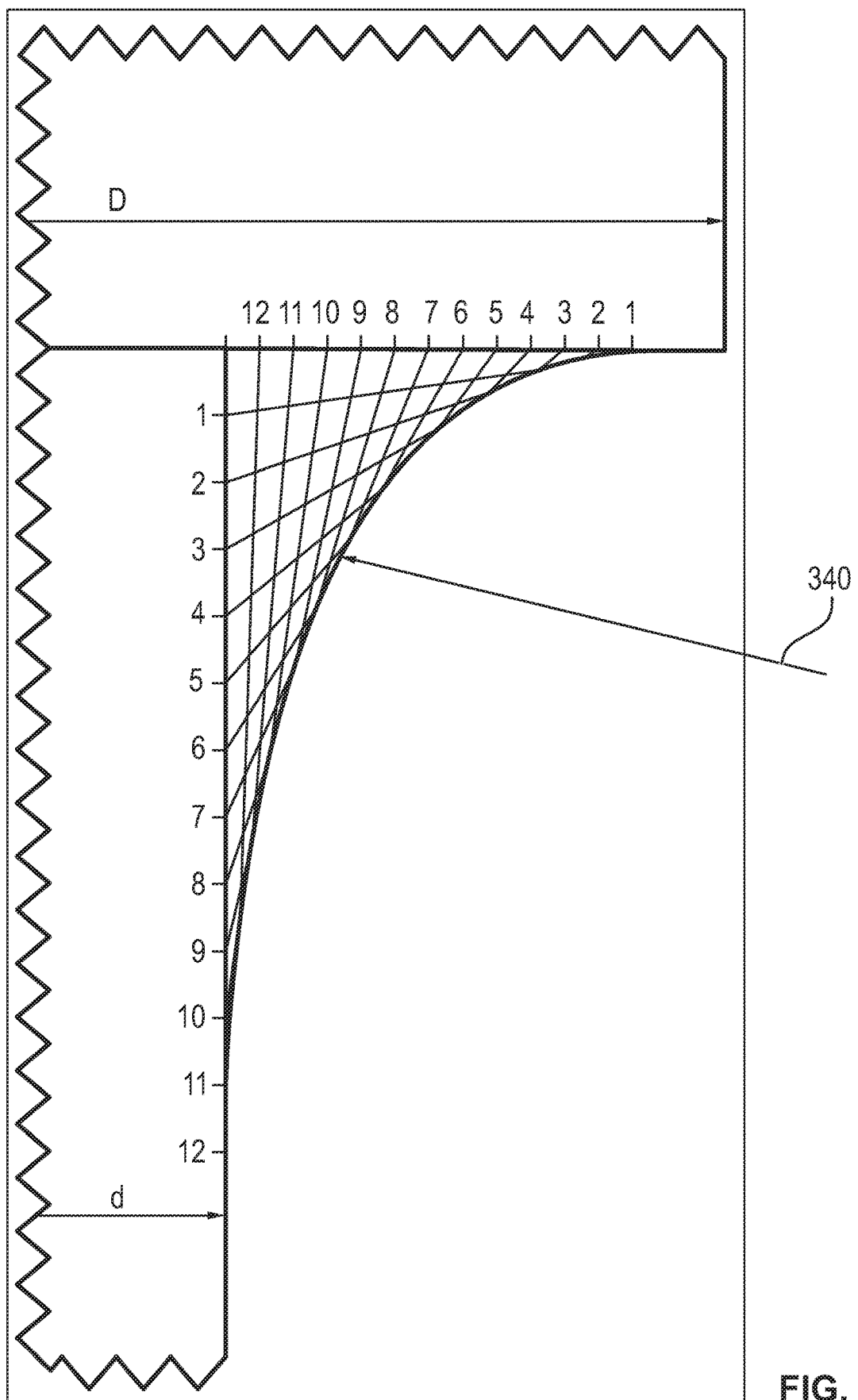
Figure 12:
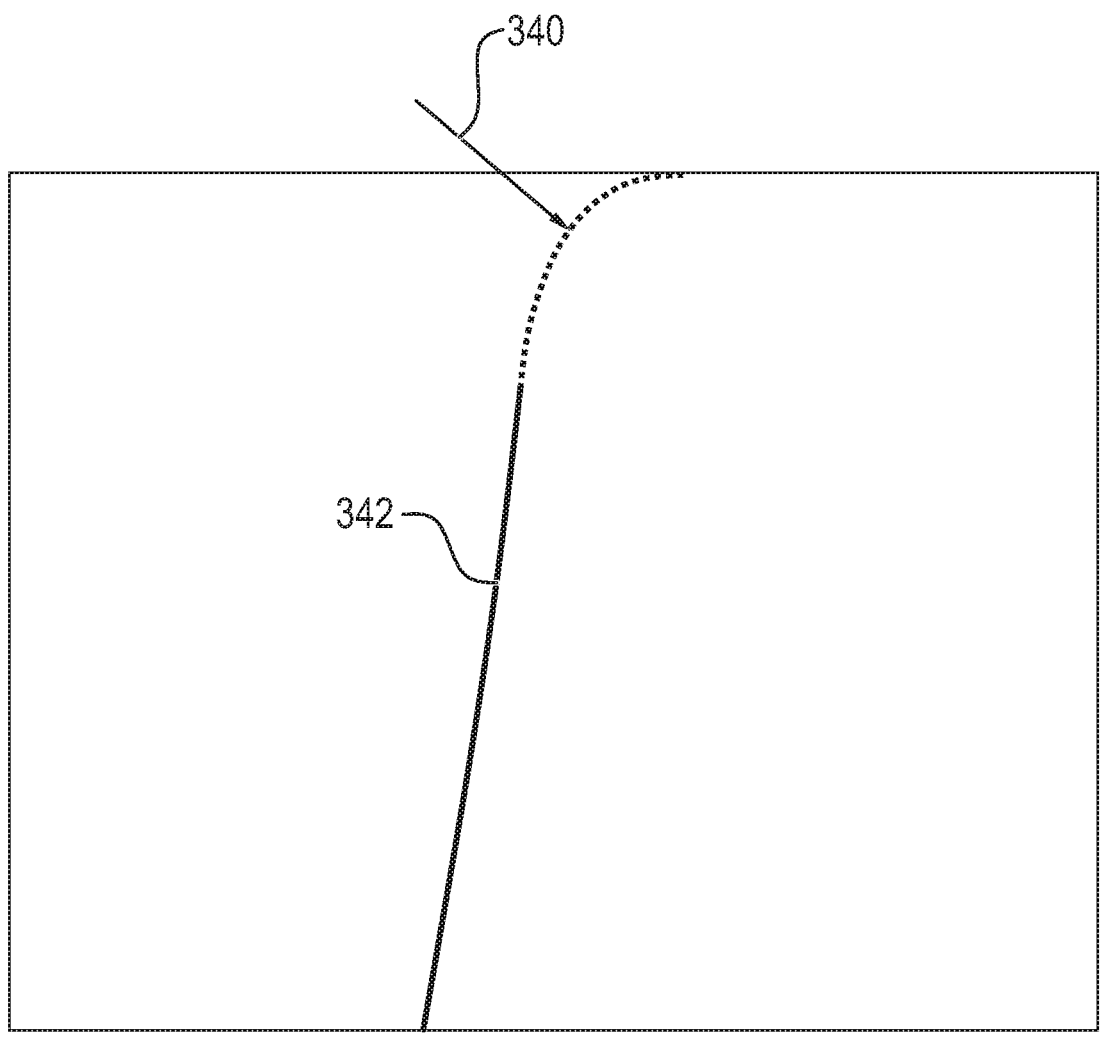
Figure 13:
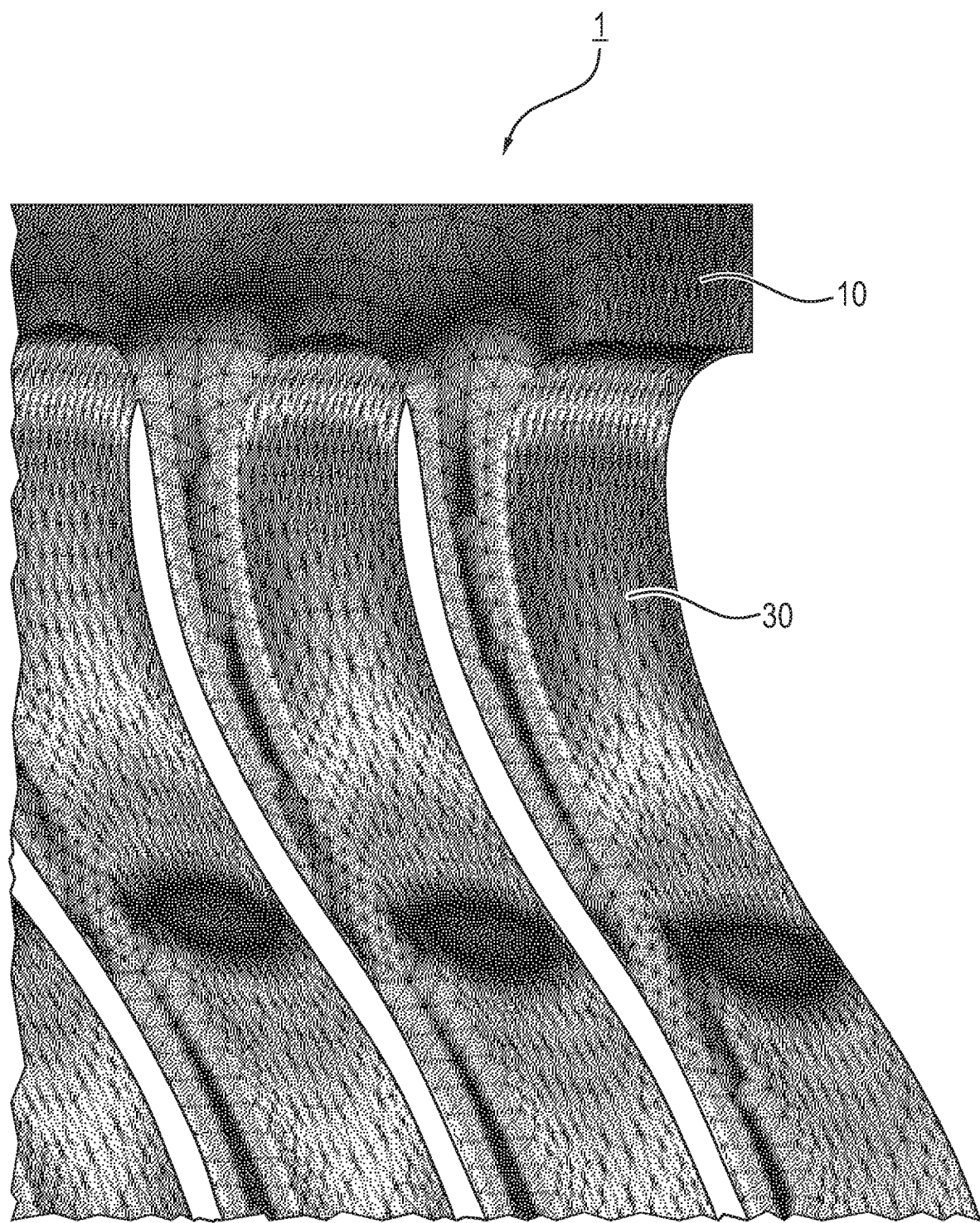
Figure 14:
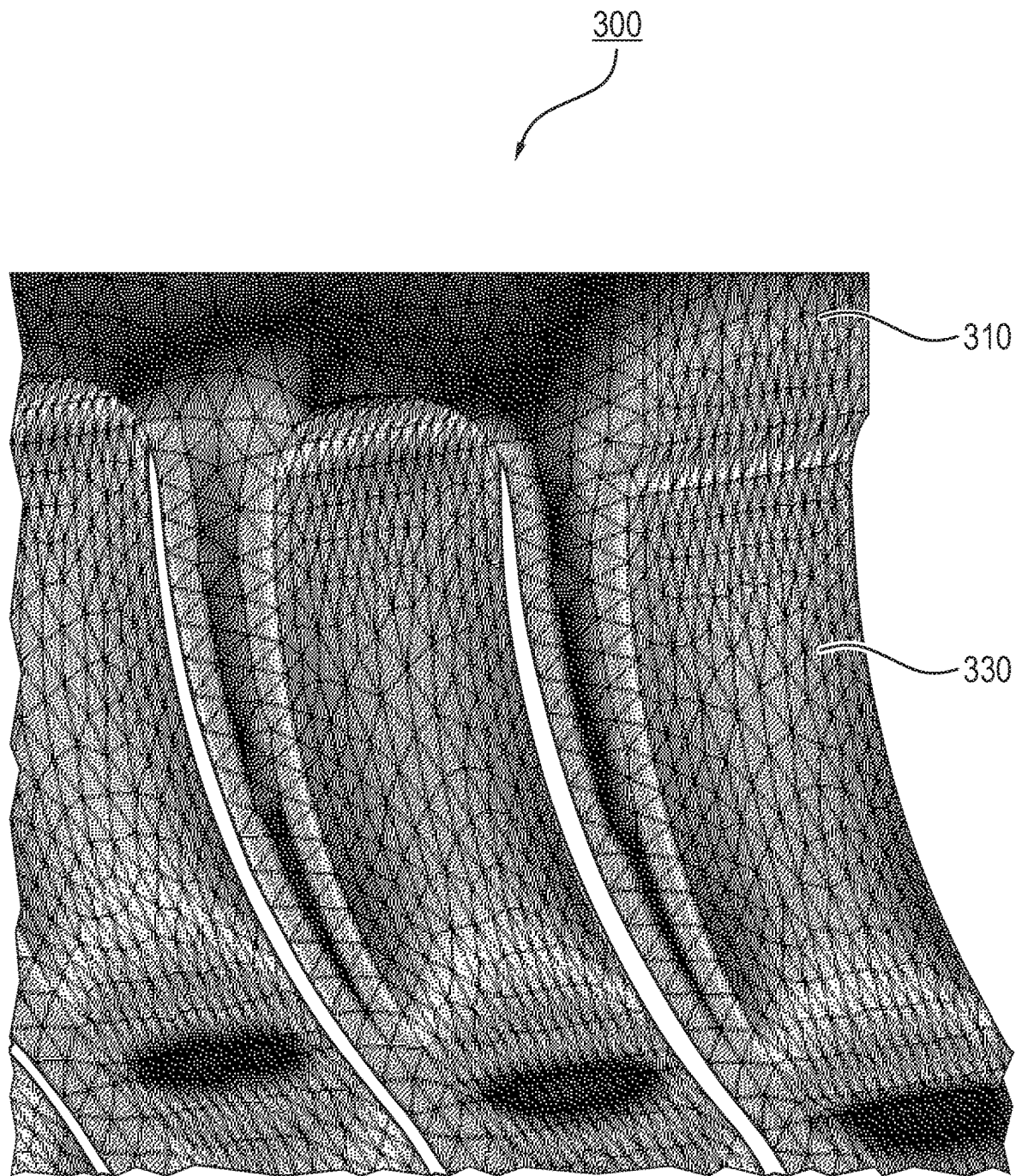
Figure 15:
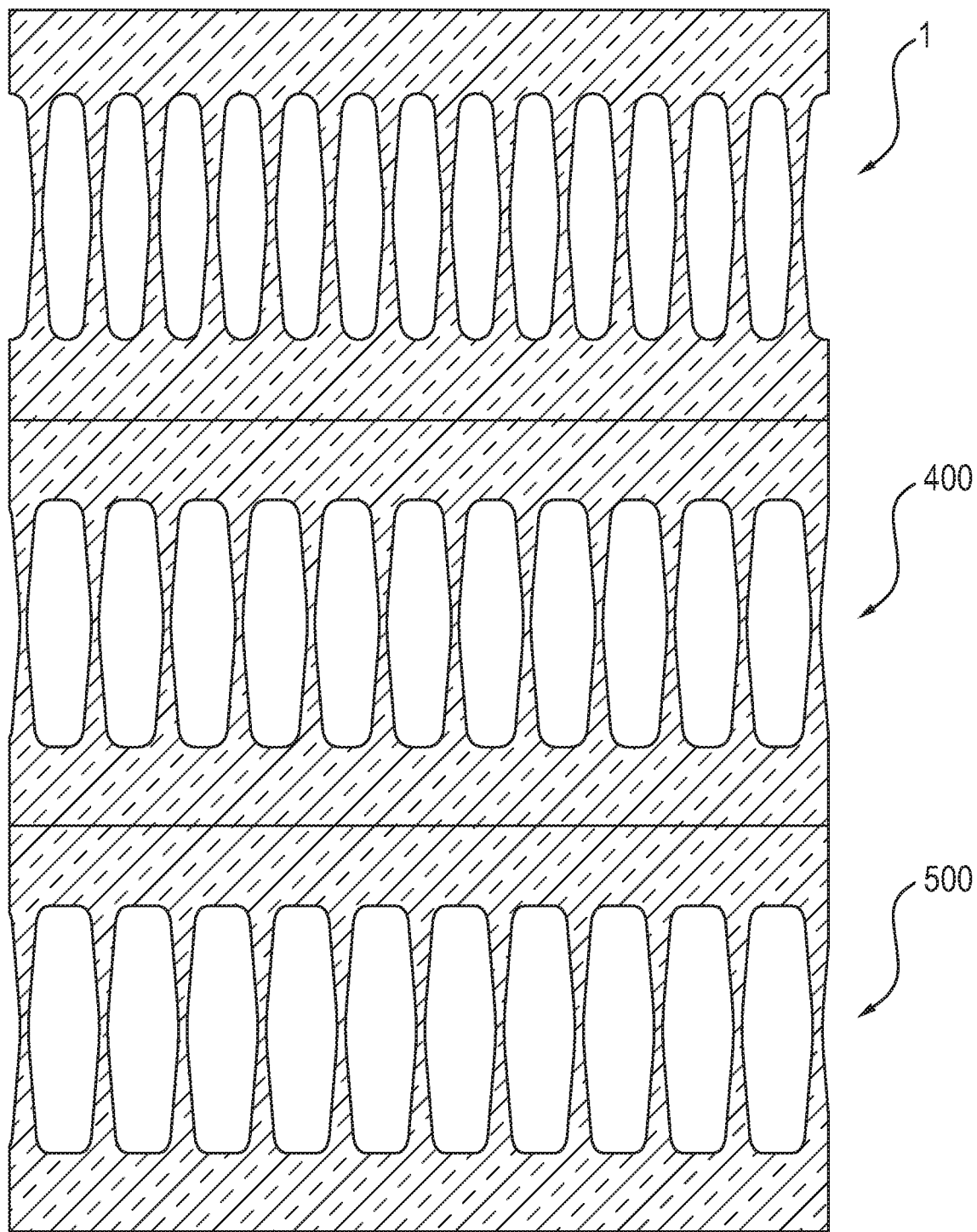
Figure 16:
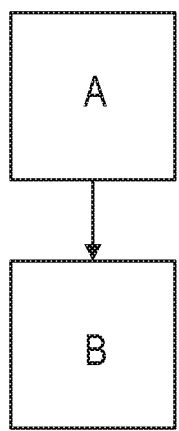
Figure 17:
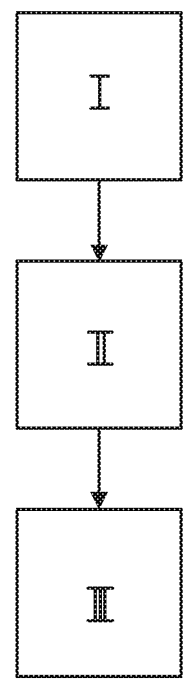

In the following, the present invention will be described in detail based on the drawings. In the drawings, the same reference signs denote the same elements and/or components. It shows:

FIG. 1 is an embodiment of a spring package which was used as starting point in an inactive state, FIG. 2 illustrates the embodiment according to FIG. 1 in an active state, FIG. 3 illustrates a first embodiment of a spring package according to the invention, FIG. 4 shows one leaf spring for explaining the mathematical calculation of the improvement, FIG. 5 is the upper half of the leaf spring of FIG. 4, FIG. 6 shows the curve of the second portion for explaining the mathematical calculation of the improvement, FIG. 7 is an embodiment of the spring package indicating the shortening of the first portion of the leaf spring at the end of the spring package, FIG. 8 is another embodiment of the spring package indicating the shortening of the first portion of the leaf spring at the end of the spring package, FIG. 9 illustrates an embodiment of the spring package having two radii in the first portion, FIG. 10 is an enlarged view of a portion of a further embodiment of a spring package according to the present invention, FIG. 11 illustrates the variable radius for constructing a first portion of a leaf spring, FIG. 12 shows an enlarged view of the first and the second portion of a leaf spring based on the embodiment of FIG. 10, FIG. 13 illustrates the stress distribution in the spring package according to FIG. 1, FIG. 14 shows the stress distribution in an embodiment of the spring package realizing at least some of the improvements of the present invention, FIG. 15 is a comparison of the embodiment of the spring package according to FIG. 1 with two embodiments of the inventive spring package, FIG. 16 a flow chart of an embodiment of an inventive manufacturing method for a spring package and FIG. 17 a flow chart of an embodiment of an inventive retrofitting method for providing a vibration welding device with a spring package.

DETAILED DESCRIPTION OF PREFERRED EMBODIMENTS

In the following, and for increasing the understanding of the present invention, a spring package 1 which served as internal starting point for the improvement is discussed with reference to FIGS. 1 and 2.

When discussing the spring packages, a right-handed Cartesian coordinate system is used for reference so that the relationship of the members of the spring packages is clearly defined. Furthermore, and as can be seen based on the figures, the spring packages are formed in one piece, i.e. the members are not releasable arranged at each other.

Now referring to FIGS. 1 and 2, the spring package 1 consists of a first 10 and a second longitudinal bar 20. The first longitudinal bar 10 serves for a fixed connection to a frame of a vibration welding device whereas the second longitudinal bar 20 serves for a connection to a tool for vibration welding. Thus, the first 10 and the second longitudinal bar 20 are movable with respect to each other. Further, and as will be explained below, the first 10 and second longitudinal bar 20 are arranged parallel to each other.

Each of the first 10 and the second longitudinal bar 20 is defined by a cuboid, wherein the cuboids are identical. In the example shown, the lower left corner of the second bar 20 is used as basis for the right-handed Cartesian coordinate system of the spring package 1. Thus, and with respect to FIG. 1, the x-axis extends along the lower edge of the second longitudinal bar 20, the y-axis is perpendicular to the plane defined by the sheet and the z-axis extends in the direction of the first longitudinal bar 10.

Due to the cuboid shape, the first 10 and second longitudinal bar 20 each have a base face defined by a rectangle, wherein the longitudinal side defines a longitudinal or first axis, corresponding to the x-axis of the Cartesian coordinate system, and the shorter side defines a second axis, corresponding to the y-axis of the Cartesian coordinate system. In this regard, one of the faces having the largest surface area is considered as base face. Consequently, the third axis of the cuboid, i.e. the z-axis of the Cartesian coordinate system, defines the height. The height of the first bar 10 is equal to the height of the second bar 20.

Additionally, the first 10 and the second bar 20 are arranged with one of their base faces opposite to each other in a desired or technically given distance. In this arrangement, imaginary first planes of the first 10 and second longitudinal bar 20 defined by the respective base faces, i.e. defined by the x-axis and y-axis of the Cartesian coordinate system, are parallel to each other. Consequently, a first axis 3 of the spring package 1 extends parallel to the x-axis of the Cartesian coordinate system. The second axis 5 of the spring package 1 extends parallel to the z-axis of the Cartesian coordinate system. Thus, the second axis 5 of the spring package 1 extends perpendicular to the first axis 3.

Moreover, the first axis 3 is part of the imaginary first plane which extends halfway between the first 10 and second longitudinal bar 20. As will be explained later, this first axis 3 thus forms, in an inactive state of the spring package 1 as shown in FIG. 1, a first axis of symmetry for the complete spring package 1.

Between the so arranged first 10 and second bar 20, a plurality of leaf springs 30 is arranged. For improving the understanding, the dotted lines in FIG. 1 serves for indicating the imaginary border between the first 10 and second longitudinal bar 20 and the plurality of leaf springs 30. The first end of each leaf spring 30 is connected to the first bar 10 and the second end is connected to the second bar 20. Thus, the second axis 5 not only extends perpendicular to the first axis 3 but also, in an inactive state of the spring package 1, parallel to the plurality of leaf springs 30.

Furthermore, and in an inactive state of the spring package 1, a center line 32 of each leaf spring 30 extends parallel to the second axis 5 of the spring package 1 in the middle of the leaf spring 30. Accordingly, the center line 32 extends in a direction which is rectangular with respect to the imaginary first planes, i.e. it extends parallel to the z-axis of the Cartesian coordinate system. The center line 32 of each leaf spring 30 forms an axis of symmetry for the respective leaf spring 30. For the sake of completeness, in case the second axis 5 of the spring package 1 is constructed in the middle of the bars 10, 20, as shown in FIG. 1, it provides a further axis of symmetry for the spring package 1 in the inactive state thereof.

An extension of each leaf spring 30 parallel to the y-axis of the Cartesian coordinate system is preferably equal to the extension of the first 10 and the second longitudinal bar 20 in y-direction. Concerning the extension of the leaf spring 30 at the first 10 or second longitudinal bar 20 in x-direction of the Cartesian coordinate system, the first portion 34 ends at the points in which the first portion 34 transitions continuously tangentially into the first 10 or second longitudinal bar 20. In the embodiment shown in FIGS. 1 and 2, two adjacent leaf springs 30 are connected to each other at the first 10 and second longitudinal bar 20 so that the side of the first portion 34 of the first leaf spring 30 facing the adjacent second leaf spring 30 directly transitions into the side of the first portion 34 of the adjacent second leaf spring 30 facing the first leaf spring 30. Thus, the first portion 34 of one leaf spring 30 transitions directly and continuously into the first portion 34 of the adjacent spring 30. This arrangement provides a specifically compact spring package.

Further concerning the extension in x-direction of the Cartesian coordinate system, which may also be denoted as thickness direction of the leaf spring 30, this extension varies along the course of the leaf spring 30 in z-direction, as will be explained in the following.

The shape of each leaf spring 30 may be considered, basically, as consisting of a double T-shape, wherein the transverse bar or line of the T serves for connecting to the respective longitudinal bar 10, 20. As a consequence, connecting the adjacent lowest or highest points of each of the gaps formed between the leaf springs 30 can be used for determining where the longitudinal bar 10, 20 ends and the first portion 34 begins.

Furthermore, both T-shapes abut each other at the first axis 3 of the spring package 1, i.e. in the middle halfway between the longitudinal bars 10, 20. The resulting imaginary abutment location corresponds to an imaginary plane comprising the first axis 3 of the spring package 1, wherein the imaginary plane is perpendicular to the second axis 5 of the spring package 1. Accordingly, each of the plurality of leaf springs 30 comprises adjacent to the first 10 and/or second longitudinal bar 20 the first portion 34 and in the region of the first axis 3 of the spring package 1 the center portion 44. The first 34 and the center portion 44 are connected with each other by means of a second portion 42.

The first portion 34 consists of exactly one radius 36 so that the first portion 34 is formed concave with respect to the spring center line 32. As can be seen, the first portion 34 transitions continuously tangentially into the respective longitudinal bar 10, 20. Accordingly, the thickness of the leaf spring 30, i.e. the extension in x-direction of the Cartesian coordinate system, decreases when following the center line 32 from one of the bars 10, 20 in the direction of the first axis 3 of the spring package 1. In the region of the center portion 44, the thickness of the leaf spring 30 is at the lowest.

Due to the definition that the thickness is at the lowest in the center portion 44, the second portion 42 connecting the first portion 34 and the center portion 44, must have a tapered shape with respect to the center line 32 of the leaf spring 30. In the example shown in FIGS. 1 and 2, the second portion 42 is formed by a linear line so that the first portion 34 transitions tangentially continuously into the second portion 42 which in turn transitions tangentially continuously into the center portion 44. The center portion 44 comprises, in this regard, adjacent to the first axis 3 a concave shape which is due to a third portion 46 comprising a radius 48 and being part of the center portion 44. Further, and in an inactive state of the spring package 1, the first 3 and the second axis 5 may be used as axes of symmetry, as shown in FIG. 1.

Concerning the connection of all previous portions 34, 42 and 44 to each other as well as to the respective first 10 and second longitudinal bar 20, the connection must satisfy in general the equations (1) and (2) at the point of connection $(x_c, y_c)$ as already explained:

$$f(x_c) = g'(x_c) \quad (1)$$

$$f(x_c) = g(x_c) \quad (2)$$

That means that the derivation of the curve and the function value must be the same at the connection point. Accordingly, the portions 34, 42 and 44 transition continuously and tangentially into each other as well as into the first 10 and second longitudinal bar 20. This condition is fulfilled by all spring packages discussed.

In addition, when defining the connection of the portions 34, 42 and 44 by isolated points and linear interpolation, it is only possible to define the derivation by differences. In general based on the following equation (3):

$$f'(x_i) \approx \frac{f(x_{i+1}) - f(x_i)}{x_{i+1} - x_i} \quad (3)$$

with:
$f'(x_i)$: derivation at point $x_i$
i: serial number of the point.

Now referring to FIG. 3, a first embodiment of a spring package 100 according to the invention is discussed. The spring package 100 corresponds to the above described exemplary spring package 1, with two exceptions.

First of all, the second portion 142 does not have the shape of a straight line which is inclined with respect to the center line 132 but is, contrary to this, formed convex. Thus, and compared to the straight linear line, the reduction in thickness along the center line 132 from the respective bar 110, 120 toward the center portion 144 is reduced, at least in a region of the second portion 142 adjacent to the first portion 134.

An advantage of this specific design, especially of the leaf springs 130, is that due to the convex shape of the second portion 142, the load experienced during usage of the spring package 100 by the respective leaf spring 130 can be significantly reduced. Especially, the load is distributed more equally within the leaf spring 130. Thus, and considering the same application, the overall load experienced by the inventive spring package is reduced compared to the prior art spring package 1. To this end, the lifetime of the spring package 100 is further increased.

As a further result, there exists the possibility to reduce the number of leaf springs 130 used in the spring package 100 compared to the prior art spring package 1 while at the same time maintaining the overall stress or load distribution within the range of the load distribution of the prior art spring package 1. Consequently, and due to the reduction of leaf springs 130, the manufacturing costs of the spring package 100 are reduced while still maintaining the quality and characteristics provided by the prior art spring packages 1.

As a further result, and especially in case the spring package 100 shall replace a spring package 1 having a specific extension along the x-axis of the Cartesian coordinate system, two adjacent leaf springs 130 may be separated at the first 110 and second longitudinal bar 120 as well as at the sides of the respective first portion 134 facing each other by a linear portion 112, 122 extending parallel to the first axis 103. In the embodiment shown in FIG. 3, such a linear portion is only indicated for the first longitudinal bar 110 although it is also present in the second longitudinal bar 120. This arrangement is particularly useful in case of a desired extension in the above discussed x-direction of the Cartesian coordinate system so that, although the number of the springs 130 may be reduced compared to a former spring package 1, the overall length, i.e. extension in x-direction, remains unchanged. By proceeding this way, the spring package 100 according to this preferred embodiment may replace also a prior art spring package in a vibration welding device without any further adaption.

Nevertheless, and in an alternative embodiment, two adjacent leaf springs may be connected to each other at the first 110 and second longitudinal bar 120 so that the side of the first portion 134 of the first leaf spring 130 facing the adjacent second leaf spring 130 directly transitions into the side of the first portion 134 of the adjacent second leaf spring 130 facing the first leaf spring 130.

Now starting from the spring package 1 according to FIGS. 1 and 2, the mathematical approach for achieving the first improvement in the design of the spring package 100, i.e. the convex second portion 142, is discussed. In this regard, we refer first of all to FIGS. 4 and 5.

FIG. 4 shows a section of the spring package 1 according to FIG. 1 with one leaf spring 30. With respect to the improved construction especially of the second portion 42 of each leaf spring 30, first of all only the bending moment of the spring package 1 is considered. Due to this, a calculation of the shape of the second part 42 of the leaf spring 30 can be based on the mathematical description of the beam of constant stress or load. In the present example, a simplified model of one leaf spring 30 is used by simplifying the whole spring package 1.

As mentioned above, the main target is to define the shape of one leaf spring 30. Accordingly, the following equation (4) is used:

$$F = \frac{F_{spr}}{n_{leaf}} \quad (4)$$

with:
F: force on one leaf spring 30
$F_{spr}$: force on the whole spring package 1
$n_{leaf}$: number of leaf springs 30.

For mathematically describing one leaf spring 30, it is necessary to consider the impact of the other leaf springs 30, because the first and second end of the leaf spring 30 does not have an angular deformation. Due to this, the bending moment must be defined at the end of the simplified model of the leaf spring 30. This can be done based on the following equation (5):

$$M_{bend} = F \frac{l_{leaf}}{2} \quad (5)$$

with:
$M_{bend}$: bending moment at the end of a leaf spring 30
F: force on one leaf spring 30
$L_{leaf}$: length of leaf spring along the z-axis of the Cartesian coordinate system.

The length of the leaf spring 30 corresponds to the distance between the first 10 and second longitudinal bar 20. In other words, the two points of the first portion 34 at which the first portion 34 is arranged tangentially to the respective longitudinal bar 10, 20 are connected by an imaginary first straight linear line. In the figures, the respective imaginary line is indicated by a dotted line. The respective first imaginary straight linear lines in the first 10 and the second longitudinal bar 20 are shown in the FIGS. 1, 4 and 5 and are connected to each other by a second straight linear line (not shown) along the z-axis of the Cartesian coordinate system, especially along the center line 32. The length of this second straight linear line or the center line 32 as illustrated, respectively, is considered as length of the leaf spring 30.

Further, and referring to the above equation (5), the bending moment at the middle of the leaf spring 30, i.e. on the first axis 3 of the spring package 1, is zero. Due to this, it is possible to simplify the whole calculation into a beam calculation.

Now considering the previous simplification, a beam of constant thickness, corresponding to the depth of the leaf spring 30 along the y-axis of the Cartesian coordinate system, and variable height, corresponding to the thickness of the leaf spring 30 along the x-axis of the Cartesian coordinate system, can be used for mathematically describing the problem. Thus, the result of the next equation (6) defines the course of the second portion 142 of the leaf spring 130 as used in FIG. 3.

$$h_Z = \sqrt{\frac{6Fz}{b\sigma}} \quad (6)$$

with:
$h_z$: height of beam, corresponding to thickness of the leaf spring 30, i.e. extension along the x-axis of the Cartesian coordinate system of the spring package 100, depending on variable z,
F: force on one leaf spring 130,
z: length of half leaf spring 130, i.e. height along the z-axis of the Cartesian coordinate system of the spring package 100 beginning or ending at the first axis 103 of the spring package 100 as indicated in FIG. 5,
b: width of the leaf spring 130, i.e. extension of the leaf spring 130 along the y-axis of the Cartesian coordinate system,
$\sigma$: desired stress or load.

Using the mathematical model according to the above example results in the second portion 142 being formed convex by using a portion of a parabolic curve, as indicated in FIG. 6. Nevertheless, the second portion 142 may have generally the shape of a natural curve in other alternatives, especially of a portion of an exponential function, a Fibonacci curve, a hyperbola or the like. It was found that the shape of such natural curves leads to a specifically homogenous stress or load distribution within the leaf spring 130 and, thus, the spring package 100.

Additionally, and with reference to FIG. 6, only a portion of the parabolic curve can be used to avoid a reduction of the thickness of the leaf spring 130 in the center portion 144 below a required minimum. For calculating the required minimum thickness, the shear stress of the force on the leaf spring 130 has to be considered. Shear stress is defined according to the following equation (7):

$$\tau = \frac{3F}{2A} \quad (7)$$

with:
$\tau$: shear stress
F: force on one leaf spring
A: area of leaf spring.

According to the von Mises hypothesis, the shear stress must also fulfill the following equation (8):

$$\tau \leq \frac{\sigma}{\sqrt{3}} \quad (8)$$

with:
$\tau$: shear stress
$\sigma$: desired stress or load.

From the previous equation (8) it is possible to define the minimal thickness of the leaf spring 130, i.e. the thickness in the direction of the first axis 103 of the spring package 100. Due to the verification of this model of calculation in an FEM analysis, it is preferred to calculate the minimum thickness with a safety factor because at the beginning of the calculated beam, i.e. in the middle of the leaf spring 130, the impact of superposition of shear and tension stress is more observable as at the other positions.

Based on the above explanations, the initial height, i.e. the initial thickness of one leaf spring 130, can be calculated based on the following equation (9):

$$h_{init} = \frac{3\sqrt{3}\,F}{2b\sigma} \qquad (9)$$

with:
- $h_{init}$: initial height of half leaf spring 130, i.e. length of half leaf spring 130 from first axis 103 of the spring package 100 to the first 110 or second longitudinal bar 120 along the z-axis of the Cartesian coordinate system,
- F: force on one leaf spring 130,
- b: width of the leaf spring 130, i.e. extension of the leaf spring 130 along the y-axis of the Cartesian coordinate system,
- σ: desired stress or load.

The minimum thickness is present in the center portion 144 at and/or adjacent the first axis 103 of the spring package 100. In this regard, the center portion 144 comprises at and/or directly adjacent the first axis 103 a third portion 146 formed by a radius 148. Due to this, the third portion 146 is formed concave with respect to the spring center line 132. Further, and adjacent to the third portion 146, a fourth portion 150 is present, which consists of a straight linear line. This fourth portion serves for connecting the third portion 146 and the second portion 142. Accordingly, and as can be seen in FIG. 6, the fourth portion 150 is formed in a linearly tapering manner with respect to the spring center line 132. Each of the portions transitions continuously, i.e. without step, into the adjacent portions, as explained above with reference to equations (1) to (3).

Due to the concave shape of the center portion 144, no acute angle is present at the first axis 103 of the spring package 100 but a rounded curve. This arrangement further improves the stress distribution within the leaf spring 130 and ensures that the thickness does not fall below a required minimum which would weaken the arrangement.

The further or second improvement is related to the leaf spring arranged at the end of the first 110 and second longitudinal bar 120 and will be explained with specific reference to FIGS. 7 and 8. This improvement is realized due to the fact that the last leaf spring 130 of the plurality of leaf springs 130 comprises a first portion which, with respect to the spring center line 132, is shorter on an outer side of the spring package 100 compared with an inner side of the spring package 100.

The prior art spring packages consist of a plurality of identical leaf springs 30, as discussed above. Accordingly, and considering the point at which the first portion 34 transitions tangentially into the respective longitudinal bar 10, 20, the extension of the first portion 34 in x-direction of the Cartesian coordinate system from the center line 32 are the same. In other words, the middle of the line defined by the two points in which the first portion 34 transitions tangentially into the respective longitudinal bar 10, 20 is arranged on the center line 32.

Now, and with respect to the embodiment shown in FIGS. 3, 7 and 8, this middle is displaced from the center line 132. This is realized by shortening the outward facing side of the first portion 134 of the leaf spring 130 arranged at the end of the spring package 100. By shortening this side of the first portion 134, the stress or load distribution especially of the last and, preferably, next-to-last leaf spring 130, can be reduced compared to a leaf spring 30 having a non-shortened first portion 34.

This displacement can be described mathematically as follows. There is an experience with the design of springs 30 that was used as starting point that leaf springs 30 at the end of the spring package 1 are the most stressed than the remaining leaf springs 30. Therefore, a force interaction between leaf spring 30 and the first 10 and second longitudinal bar 20 has to be described. To this end, first of all the type of stress in each of the leaf springs 30 has to be identified.

In this regard, there is also a bending moment from each of the leaf springs 30 which acts on the first 10 and second longitudinal bar 20. Summing the respective bending moments of each of the leaf springs 30 results in a total bending moment acting on the first 10 and second longitudinal bar 20. This resulting bending moment wants to tilt the first 10 and second longitudinal bar 20. Further, the summed bending moment acts on each of the leaf springs 30 by means of a tension and compression force.

In this regard, and when moving the second longitudinal bar 20 to the right, i.e. in plus x-direction of the Cartesian coordinate system, the leaf spring 30 at the left outer side of the spring package 1 is more tensed as other leaf springs 30 and the leaf spring 30 at the right outer side is more compressed as other leaf springs 30. In other words, the tensed part of the leaf spring 30 at the left outer side has the most tension stress than the remaining leaf springs 30 and the leaf spring 30 at the right outer side has the most compression stress.

According to the previous description of the stress distribution between the leaf springs 30, it is worth to lighten the marginal leaf springs 30, i.e. the leaf springs 30 at the end of the spring package 1. This is done by shortening the first portion 134 of the leaf spring 130 at the end as well as the first 110 and second longitudinal bar 120 of the spring package 100, which is indicated by reference sign 114 in FIG. 7. Due to this, the bending moment of the first 110 and second longitudinal bar 120 is not so much transferred to the marginal leaf springs 130, i.e. the leaf springs 130 at the end of the spring package 100. Accordingly, the stress on the marginal leaf springs 130 is reduced whereas it is increased for the leaf springs 130 in the middle of the spring package 100. Consequently, the distribution of stress is better over the complete spring package 100.

Now referring to FIG. 9, a further embodiment of a spring package 200 is described. This embodiment corresponds mainly to the previous embodiment of the spring package 100. As a further improvement, the first portion 234 consists of two different radii, i.e. a smaller first radius 236 and a larger second radius 238. The smaller first radius 236 is present adjacent to the first 210 and/or second longitudinal bar and the larger second radius 238 is present adjacent to the second portion 242. The usage of two different radii in this order further improves the stress distribution within the leaf springs 230 of the spring package 200.

FIG. 10 shows a section of a further embodiment of a spring package 300 of the present invention. This spring package 300 corresponds mainly to the above discussed spring packages 100 and 200. As a further improvement, the first portion has a variable radius 340. With respect to the term variable radius and its definition, it is especially referred to the publication of J. T. P. Castro et al: "A note on notch shape optimization to minimize stress concentration", in Theoretical and Applied Fracture Mechanics 84, 2016, p. 72-85, Elsevier Ltd. Therein, it is referred to Grodzinski's graphical recipe for shoulder fillets proposed in 1941 which is also shown in the present FIG. 11.

For calculating the first portion having the variable radius 340, an interpolation of the variable radius curve in the points of section lines was used. A definition of this curve does not directly calculate with the initial or final radius so that additional verification of the radius is necessary to reach a technologically realizable radius. The respective radius for the verification is set according to the definition of a circle by three points, which is shown in the following equation (10).

$$r = \sqrt{(x-x_1)^2 + (y-y_1)^2} = \sqrt{\frac{B^2 + C^2 - 4AD}{4A^2}} \quad (9)$$

with:

$A = x_1(y_2-y_3) - y_1(x_2-x_3) + x_2y_3 - x_3y_2$
$B = (x_1^2+y_1^2)(y_3-y_2) + (x_2^2+y_2^2)(y_1-y_3) + (x_3^2+y_3^2)(y_2-y_1)$
$C = (x_1^2+y_1^2)(x_2-x_3) + (x_2^2+y_2^2)(x_3-x_1) + (x_3^2+y_3^2)(x_1-x_2)$
$D = (x_1^2+y_1^2)(x_3y_2-x_2y_3) + (x_2^2+y_2^2)(x_1y_3-x_3y_1) + (x_3^2+y_3^2)(x_2y_1-x_1y_2)$

If the calculated minimal radius is not lower than the technologically realizable minimal radius, it is preferred to verify every created variable radius curve. As a further alternative and with respect to larger radii, they may be determined based on FEM analysis. In this regard, FIG. 12 shows the combination of the convex second portion 342 and the first portion having the variable radius 340.

Now referring to FIGS. 13 and 14, a comparison of the stress distribution within the spring package 1 used as starting point and an embodiment of the inventive spring package 300 is shown. As can readily be seen, the stress on the marginal leaf spring 330 is clearly reduced compared to the marginal leaf spring 30 of the spring package 100.

A further overall comparison of the spring packages is shown in FIG. 15. Therein, the spring package 1 which was used as starting point is shown at the top. The two further spring packages 400 and 500 arranged below correspond to the spring package 300 discussed above and differ only in the number of leaf springs used. In this regard, the spring package 1 comprises 14 leaf springs 30, the spring package 400 comprises twelve leaf springs and the spring package 500 comprises eleven leaf springs.

For further clarifying the improvements realized by the present invention, the different embodiment shown in FIG. 15 are compared based on the calculated values for the usage of the spring package in a vibration welding device. As a reference, the stress experienced by the spring package 1 having 14 leaf springs 30 according to different simulations is defined as having the value without unit of 100.

In comparison, an inventive spring package having also 14 leaf springs will experience a stress having a value without unit of about 94.6, according to the simulation. When now reducing the number of leaf springs to 13 leaf springs, the stress experienced by the inventive spring package has, according to the simulation, a value without unit of about 96.6. Thus, the stress experienced by an inventive spring package having 13 leaf springs is well below the stress experienced by the spring package 1 having 14 leaf springs. Accordingly, the number of leaf springs may be further reduced.

To this end, an inventive spring package 400 having twelve leaf springs was simulated. As a result, the stress experienced by this spring package 400 having twelve leaf springs had a value without unit of about between 96.9 and 99.1, depending on the type of simulation.

As both values were still below the value without unit of 100 for the spring package 1 having 14 leaf springs, an inventive spring package 500 having eleven leaf springs was simulated. The stress experienced by this spring package 500 having eleven leaf springs had a value without unit of about between 98.9 and 101.8, depending on the type of simulation.

Finally, an inventive spring package comprising only ten leaf springs was simulated. This lead to a stress having a value without unit of 101.1. Thus, the stress experienced by this spring package would be too high so that the usage of the inventive spring package 500; 400 comprising eleven or twelve leaf springs, respectively, is preferred when replacing a former spring package 1 with 14 leaf springs.

An embodiment of an inventive vibration welding device (not shown) comprises at least one inventive spring package 100; 200; 300; 400; 500. By using the inventive spring package 100; 200; 300; 400; 500 in a vibration welding device, the advantages mentioned above for the inventive spring package 100; 200; 300; 400; 500 can be realized with the vibration welding device. Thus, and for avoiding repetitions, it is referred to the above explanations.

An embodiment of an inventive manufacturing method for an inventive spring package 100; 200; 300; 400; 500 is described with reference to FIG. 16. In a first step A, a block of material is provided. In the subsequent step B, the block of material is processed, especially by milling. This is done to create the first 110; 210; 310 and the second longitudinal bar 120 as well as the plurality of leaf springs 130; 230; 330, wherein each of the plurality of leaf springs 130; 230; 330 comprises adjacent to the first 110; 210; 310 and/or second longitudinal bar 120 a first portion 134; 234; 334 consisting of at least one radius 136; 236; 238; 340 so that the first portion 134; 234; 334 is formed concave with respect to the spring center line 132; 232; 332. The first portion 134; 234; 334 transitions continuously into the second portion 142; 242; 342 which is formed convex with respect to the spring center line 132; 232; 332 and the second portion 142; 242; 342 transitions continuously into the center portion 144; 244; 344 arranged adjacent the first axis 103; 203; 303 so that a thickness of the respective leaf spring 130; 230; 330 is at the lowest in the center portion 144; 244; 344, especially at the first axis 103; 203; 303. Accordingly, the inventive spring package 100; 200; 300; 400; 500 can be manufactured by means of the inventive manufacturing process. Consequently, it is referred to the above discussion for the inventive spring package 100; 200; 300; 400; 500 regarding the advantages and technical effects.

Finally, and with respect to FIG. 17, an embodiment of an inventive retrofitting method for providing a vibration welding device with at least one inventive spring package 100; 200; 300; 400; 500 is illustrated. Therein, at least one inventive spring package 100; 200; 300; 400; 500 is provided in a first step I. De-mounting the at least one spring package being present in the vibration welding device is performed in step II. Finally, and in step III, the at least one inventive spring package 100; 200; 300; 400; 500 is mounted into the vibration welding device. Thus, by means of this retrofitting method, a vibration welding device being already present, for example at a customer's site, can be effectively equipped with the inventive spring package 100;

200; 300; 400; 500 so that also the above mentioned advantages and technical effects may be realized by this vibration welding device.

PARTS LIST FOR FIGS. 1-17

1 spring package
3 first axis
5 second axis
10 first longitudinal bar
20 second longitudinal bar
30 leaf spring
32 center line
34 first portion
36 first radius
42 second portion
44 center portion
46 third portion
48 radius of third portion 46
100 Spring package
103 first axis
105 second axis
110 first longitudinal bar
112 linear portion
114 portion to be shortened/cut
120 second longitudinal bar
130 leaf spring
132 center line
134 first portion
136 first radius of first portion 134
142 second portion
144 center portion
146 third portion
148 radius of third portion 146
150 fourth portion
200 Spring package
203 first axis
210 first longitudinal bar
230 leaf spring
232 center line
234 first portion
236 first radius of first portion 234
238 second radius of first portion 234
242 second portion
244 center portion
246 third portion
248 radius of third portion 246
250 fourth portion
300 Spring package
310 first longitudinal bar
312 linear part
340 variable radius of first portion
342 second portion
346 third portion
350 fourth portion
400 spring package
500 spring package It will be apparent that other modifications and variations of the foregoing exemplary embodiments will be understood from the foregoing description as well as the following claims.

The invention claimed is:

1. A spring package for a vibration welding device, comprising:
   a) a first longitudinal bar for a fixed connection to a frame of the vibration welding device,
   b) a second longitudinal bar being parallel to and movable with respect to the first longitudinal bar as well as for a connection to a tool, wherein a first axis of the spring package extends halfway between and parallel to the longitudinal axis of the first and second longitudinal bar,
   c) a plurality of leaf springs, each of which is connected with a first end to the first longitudinal bar and with a second end to the second longitudinal bar, wherein a second axis of the spring package extends perpendicular to the first axis as well as, in an inactive state of the spring package, parallel to the plurality of leaf springs so that a spring center line extends, in the inactive state of the spring package, parallel to the second axis in the middle of the leaf spring, and
   d) each of the plurality of leaf springs comprises, adjacent to the first and/or second longitudinal bar, a first portion including at least one radius so that the first portion is formed concave with respect to the spring center line, wherein
   e) the first portion transitions continuously into a second portion and the second portion transitions continuously into a center portion arranged adjacent the first axis so that a thickness of the respective leaf spring is at the lowest in the center portion, and
   f) the second portion is formed convex with respect to the spring center line and has the shape of a portion of a parabola, an exponential function, a Fibonacci curve or a hyperbola.

2. The spring package according to claim 1, wherein the leaf spring arranged at the end of the first and second longitudinal bar comprises a first portion which, with respect to the spring center line, is shorter on an outer side of the spring package compared to an inner side of the spring package.

3. The spring package according to claim 1, wherein the center portion comprises a third portion including at least one radius so that the third portion is formed concave with respect to the spring center line.

4. The spring package according to claim 3, wherein the center portion comprises between the third portion and the adjacent second portion a fourth portion which is formed in a linearly tapering manner with respect to the spring center line.

5. The spring package according to claim 1, wherein the first portion comprises at least two different radii and the smaller radius of the at least two different radii is present adjacent to the first and/or second longitudinal bar and the larger radius of the at least two different radii is present adjacent to the second portion.

6. The spring package according to claim 1, wherein the first portion has a variable radius.

7. The spring package according claim 1, wherein two adjacent leaf springs are connected to each other at the first and second longitudinal bar so that the side of the first portion of the first leaf spring facing the adjacent second leaf spring directly and continuously transitions into the side of the first portion of the adjacent second leaf spring facing the first leaf spring.

8. The spring package according to claim 1, wherein two adjacent leaf springs are separated at the first and/or second longitudinal bar as well as at the sides of the respective first portion facing each other by a linear portion extending parallel to the first axis.

9. The spring package according to claim 1, wherein the first and the second longitudinal bar as well as the plurality of leaf springs are formed in one piece.

10. A vibration welding device comprising at least one spring package according to claim 1.

11. A manufacturing method for a spring package according to claim 1, comprising the steps of:
   a. providing a block of material,
   b. processing the block of material, especially by milling, to create the first and the second longitudinal bar as well as the plurality of leaf springs, wherein each of the plurality of leaf springs comprises adjacent to the first and/or second longitudinal bar a first portion consisting of at least one radius so that the first portion is formed concave with respect to the spring center line, wherein the first portion transitions continuously into the second portion which is formed convex with respect to the spring center line and the second portion transitions continuously into the center portion arranged adjacent the first axis so that a thickness of the respective leaf spring is at the lowest in the center portion.

12. A retrofitting method for providing a vibration welding device with at least one spring package according to claim 1, comprising the steps:
   a. providing at least one spring package according to claim 1,
   b. de-mounting the at least one spring package being present in the vibration welding device and
   c. mounting the at least one spring package according to claim 1 into the vibration welding device.

* * * * *